United States Patent Office 3,165,173
Patented Jan. 12, 1965

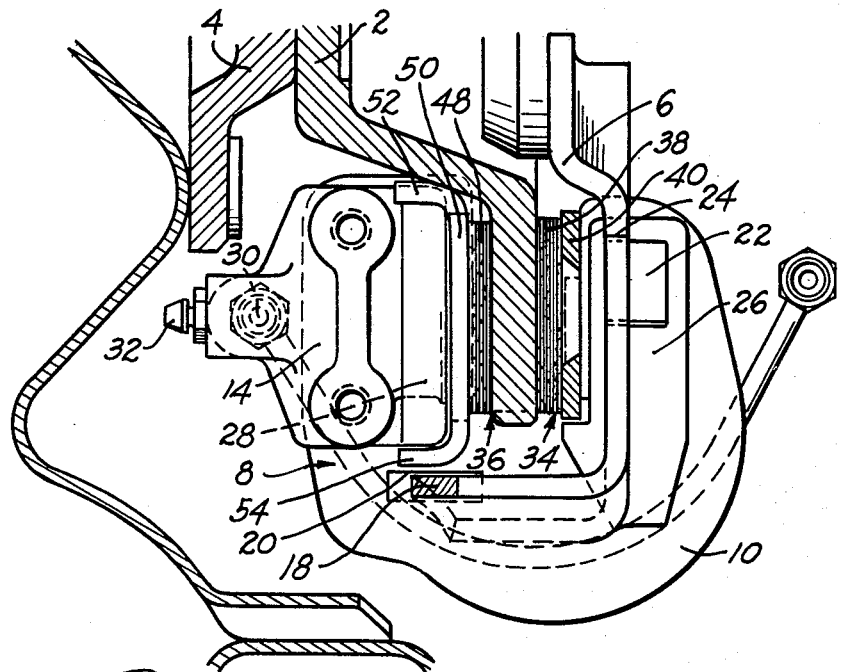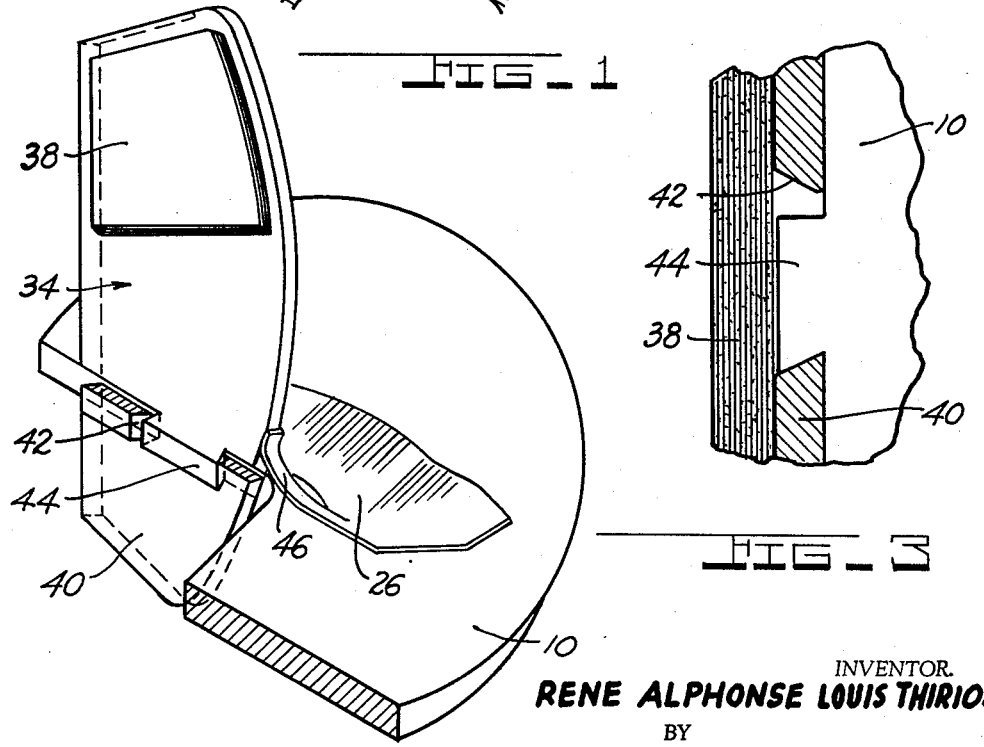

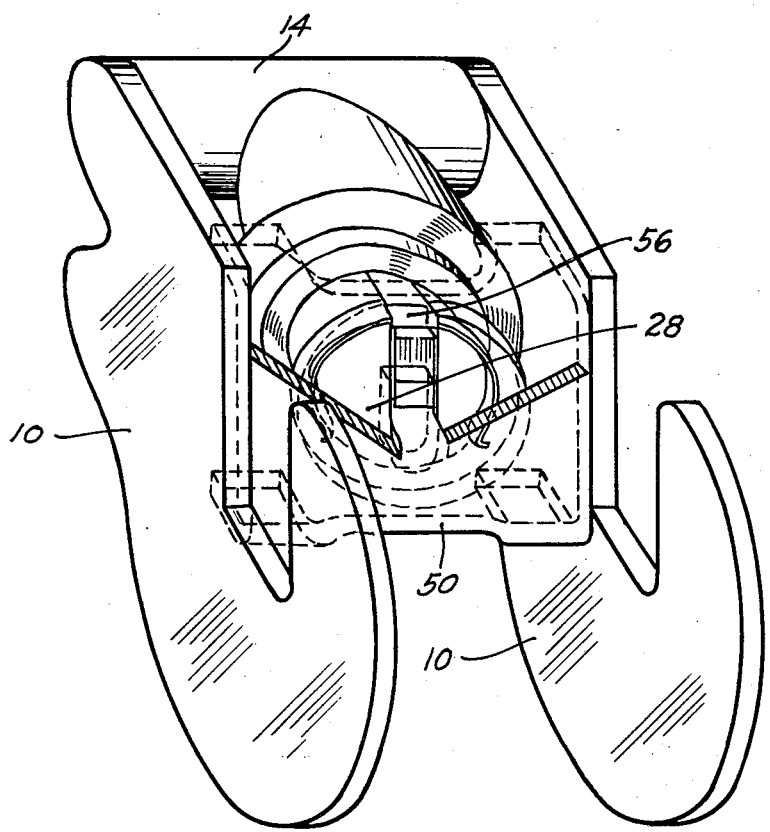
FIG_4
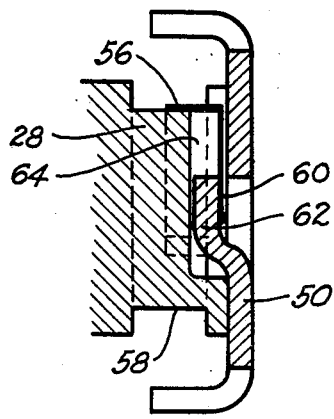
FIG_5
FIG_6

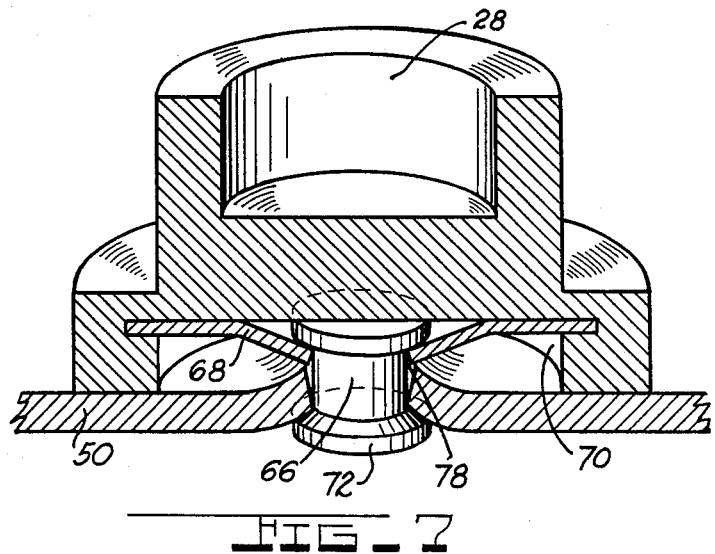
FIG_7
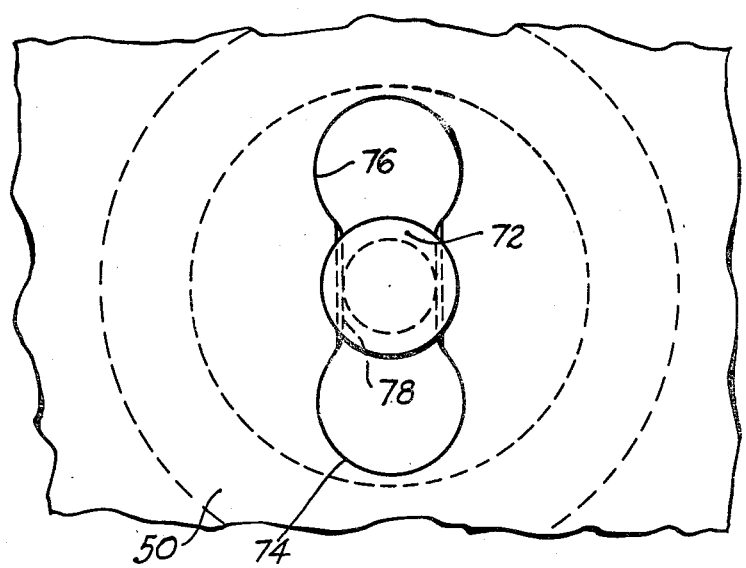
FIG_8

3,165,173
DISC BRAKES
René Alphonse Louis Thirion, Paris, France, assignor to Société Anonyme D.B.A., Paris, France, a company of France
Filed Nov. 26, 1962, Ser. No. 240,180
5 Claims. (Cl. 188—73)

The invention relates to disc brakes and more particularly to caliper type disc brakes comprising a housing or caliper straddling the periphery of the disc to be braked and overlying only a portion thereof, two friction members disposed on opposite sides of the disc, and means carried by said housing for applying the friction members against the faces of the disc.

To prevent the friction members from chattering and rattling when they are in their retracted position and the brake is subjected to vibrations or shocks, it is preferred to attach each friction member to the part of the applying means which is adapted to urge the friction member against the adjacent face of the disc.

The object of the invention is to provide simple means for attaching each friction member to the part of the applying means which is adapted to urge said friction member against the adjacent face of the disc, which attaching means makes possible a quick mounting and dismounting of the friction members.

In the fixed caliper type disc brakes including at least one hydraulic motor on each side of the disc, each friction member is adapted to be urged against the disc by the piston of the adjacent hydraulic motor, while in the floating caliper type disc brakes including a single hydraulic motor disposed on one side of the disc, the friction member disposed adjacent the hydraulic motor is adapted to be urged against the disc by the piston of the hydraulic motor and the other friction member is adapted to be urged against the disc by a portion of the caliper disposed on the other side of the disc and acting as a pressure member. The present invention provides means for attaching a friction member to the pistons of a hydraulic motor as well as to the pressure member of a floating caliper.

According to the invention each friction member is attached to the part of said applying means which is adapted to urge the friction member against the adjacent face of the disc by a resilient member which urges the friction member against said part and which is adapted to yield resiliently to allow the mounting and dismounting of the friction member.

The features of the invention will appear from the following description which refers to the accompanying drawings in which:

FIGURE 1 is a side view of a disc brake embodying the invention, one of the yoke members of this brake being removed and some parts of the brake being shown in section, the section being effected along the plane of the removed yoke member;

FIGURE 2 is a perspective view of a portion of one of the yoke members of the brake of FIGURE 1 and of the friction pad attached to the yoke members, a portion of the lining of this pad being removed;

FIGURE 3 is a partial view in section of the friction pad shown in FIGURE 2, the section being effected along the plane of the outer face of the yoke member;

FIGURE 4 is a partial perspective view of the brake of FIGURE 1 which shows the mode of attachment of the pad to the piston of the hydraulic cylinder;

FIGURE 5 is a partial view in section of the piston and of the friction pad attached thereto;

FIGURE 6 is a perspective view of a member which serves to attach the pad to the piston;

FIGURE 7 is a perspective view which shows another mode of attachment of the pad to the piston, some parts being shown in section; and FIGURE 8 is a view in elevation which shows the underface of the assembly shown in FIGURE 7.

The brake shown in FIGURE 1 is of the type shown and described in French patent specification No. 1,289,-454 filed on the 10th of November 1960 in the name of the applicant, and one may refer thereto to have more details about the structure of this brake.

The brake shown in FIGURE 1 comprises a rotatable disc 2 secured to the hub 4 of the wheel to be braked, a fixed support plate 6 secured to the wheel axle, and a housing or caliper designated as a whole by the reference number 8 which is allowed to slide on the support plate 6 in a direction parallel to the axis of the wheel. The support plate is L-shaped and has a vertical branch adjacent to one face of the disc. The housing 8 comprises two yoke members 10 (only one of these yoke members is shown in FIGURE 1) which are connected by bolts to a respective side of the body 14 of a hydraulic motor or cylinder disposed on the side of the disc opposite to that adjacent to the support plate 6. The yoke members extend transversely to and are disposed on opposite sides of the support plate. The yoke members 10 are supported by lugs 18 provided on the horizontal branch of the support plate which are received in elongated openings 20 of the yoke members 10. The length of these openings are larger than the width of the lugs 18 to allow movement of the housing 8 with respect to the support plate 6. Stamped bosses 22, formed on the portion of the yoke members adjacent to the vertical branch of the support plate, are slidably received in slots 24 cut in the edges of the support plate and serve together with the lugs 18 to support the housing 8 and to guide it in its axial movements.

In the cylinder body 14 is provided a bore in which a piston 28 is adapted to move under the action of fluid pressure admitted in the bore through an inlet port 30 provided in the cylinder wall. The cylinder is also provided with a bleeding port 32.

Two leaf springs 26 (only one is shown in FIGURE 1), which are somewhat convex in relaxed condition are interposed each between the support plate 6 and one of the yoke members 10 to prevent the yoke members to noisily engage the support plate. The leaf springs 26 are supported in place by the bosses 22 which are received in openings of the leaf springs.

The yoke members 10 support the friction members or pads 34 and 36 disposed on opposite sides of the disc 2. The pad 34 is formed of a friction lining 38 attached to a backing plate 40. The plate 40 is deprived of friction lining over its central portion in order to provide a more uniform wear of the lining. The plate 40 is formed adjacent each end with an opening 42, which is trapezoidal in section as shown in FIGURES 2 and 3, which receives a tenon 44 provided on the adjacent branch of each yoke member 10. The lower and upper walls of openings 42 are tapered and the distance between these walls increases from the outer face of the plate 40 to the inner face thereof as shown in FIGURE 3. One face of the tenons, the lower one in the drawings, is inclined at an acute angle with respect to the adjacent edge of the yoke member. This angle is equal to the angle of taper of the wall of opening 42 against which the tenon is urged. A finger 46, integral with each leaf spring 26 (see FIGURE 2) bears against the lower edge of friction pad 34 and urges the lower wall of openings 42 against the inclined face of the tenons. The pad 34 is thus positively attached to the yoke members 10 and serves as a brace member for the yoke members. The height of the openings 42, which is the smallest at the outer face of the plate 40, somewhat exceeds the height of the base of the tenons 44 in order to facilitate the insertion of the tenons in the openings.

The friction pad 36, which is located on the same side of the disc as the cylinder body 14 and is adapted to be applied on the adjacent face of the disc 2 by the piston 28, is formed of a friction lining 48 secured to a backing plate 50 which is provided at its ends with legs 52 and 54 for increasing the anchoring surface of the pad on the yoke members. The pad 36 is attached to the piston 28 by means of a resilient ring 56 tightened around the bottom of an annular groove 58 formed in the piston. The ring 56 has an integral resilient finger 60 bent perpendicularly to the axis of the ring and is received behind a tongue 62 formed integral with or attached to the plate 50 of the pad 36. The finger 60 and tongue 62 are located in a radial groove 64 formed on the head of piston 28, and the position of the groove 58 on the piston is so selected in relation to the size and shape of ring 56 that the finger 60 is distorted from its relaxed position and resiliently urges the pad 36 against the end face of the piston 28. The width of groove 64 is slightly larger than that of tongue 62 to allow small circumferential movements of the pad 36 with respect to the piston and prevent tangential forces from being transmitted from the pad to the piston. Groove 64 and tongue 62 might be disposed in a position at right angles to that shown in FIGURE 4.

To attach the pad 36 to the piston 28, the ring 56 is first placed in the groove 58, then the tongue 62 is inserted behind the finger 60 in the groove 64 while the pad is inclined relative to the piston to facilitate this insertion, and thereafter the pad is moved radially to bring it in correct position. To remove the pad, after the housing has been disassembled from its support, the pad is drawn radially and is simultaneously inclined to move the tongue 62 out of the groove 64. On FIGURES 4 and 5 of the drawings the friction lining of pad 36 has not been shown.

In FIGURES 7 and 8 another mode of attachment of pad 36 to piston 28 is represented. In this embodiment the pad is attached to the piston by means of a spool-shaped member 66 which is secured to the piston by means of a resilient washer 68 having its outer edge fixed to the piston head, as by crimping. Member 66 and washer 68 are disposed in a cylindrical recess 70 of the piston having such a depth that the head 72 of member 66 projects outwardly of said recess beyond the end face of the piston. Two holes 74 and 76, having a diameter which slightly exceeds that of the head 72 of member 66, are cut in the backing plate 50 of pad 36. These two holes are interconnected by a slot 78 having a width which slightly exceeds the diameter of the body of member 66. The edges of slot 78 are slightly bent outwardly as shown in FIGURE 7, and the head 72 of member 66, which is joined to the body of member 66 by a frusto-conical portion, is received below the edges of slot 78. The height of member 66 is selected relative to the position of washer 68 on the head of piston 28 and of the thickness of plate 50 so that the resilient washer 68 is distorted from its relaxed position when the head 72 of member 66 is engaged below the edges of slot 78, and resiliently urges the pad 36 against the head of piston 28.

To attach the friction pad to the piston, the head 72 of member 66 is inserted in one of the holes 74 and 76 and then the pad is moved relatively to the piston in a direction parallel to slot 78 to force the body of member 66 into slot 78. Because the head 72 has a frusto-conical surface, member 66 is easily inserted in slot 78, and as member 66 is moved forwardly in the slot 78, it flexes the washer 68 downwardly. Owing to its resiliency, the washer 68 then urges the pad against the piston. To remove the pad 36, it will suffice to displace the pad relatively to the piston in a direction parallel to slot 78 to disengage member 66 from the slot and move it in hole 74 or 76. Two holes 74 and 76 have been provided to allow mounting and removal of the friction pad by displacement of the pad relatively to the piston in either direction and consequently to facilitate this mounting or removal. However, it is obvious that one may provide only one hole 74 or 76 and the slot 78 and in this event, the bottom of slot 78 might be used as an abutment for member 66 defining the correct position of the pad with respect to the piston.

Since the head 72 of member 66 projects beyond the surface of plate 50, it is obvious that the latter must be deprived of friction lining over its central portion or a recess must be formed in the friction lining below holes 74 and 76 and slot 78 for receiving the head 72 of member 66.

In FIGURES 7 and 8 the friction lining of pad 36 has not been shown.

To disassemble the friction pads from the brake it will suffice to remove one of the yoke members 10 by unscrewing the bolts securing this yoke member to the cylinder body 14 and then rock this yoke member to disengage the tenon 44 from the opening 42 in which it is engaged. Thereafter it is possible to remove the assembly formed of the housing and the friction pads and to disassemble the pads from the housing.

The operation of this type of brake is well-known and will not be described in details. It suffices to note that when a liquid under pressure is admitted in the bore of the cylinder body 14 the pressure acts simultaneously on the piston 28 which applies the pad 36 against the adjacent face of the disc 2 and on the cylinder body which applies the pad 34 against the other face of the disc through the intermediary of yoke members 10. A return spring located in the cylinder bore moves the pads apart from the disc brake when the pressure in the cylinder bore is released. An automatic wear compensating device may be provided in the cylinder bore to maintain a constant clearance between the pads and the disc in the deenergized conditions of the brake, in spite of lining wear.

Although the invention has been described above in application of floating caliper disc brake, it is obvious that it can be used as well as in a fixed caliper disc brake.

What is claimed is:

1. In a disk brake, a connection between a piston and a friction member comprising: a piston having a friction member engaging face, a recess in said face, a resilient member secured to said piston and located in said recess, said resilient member having an opening therein, a spool shaped member having a necked portion between the ends thereof, each end of said spool shaped member defining a head, one of said heads being of greater dimension than said opening, and located between said resilient member and the bottom of said recess whereby said spool shaped member is secured to said piston, said necked portion of said spool shaped member extending through said opening away from said piston face, said friction member comprising a backing plate and a friction lining secured thereto, an opening in said backing plate, a first portion of said backing plate opening being larger than the other head of said spool shaped member and a second portion of said backing plate opening being smaller than said other head, said necked portion extending through said second portion of said backing plate opening and said other head being located between said backing plate and said lining whereby said friction member is secured to said piston, said spool shaped member being of such a length to stress said resilient member when said friction member is attached to said piston whereby said friction member is biased into engagement with said piston face.

2. The structure as recited in claim 1 wherein the portion of each head engaging said resilient member and said backing plate is frusto-conical shaped.

3. The structure as recited in claim 1 wherein the edge of said backing plate opening is bent away from said friction lining.

4. The structure as recited in claim 1 wherein said backing plate opening has a third portion which is the same size as said first portion of said backing plate opening and is on the side of said second portion which is opposite to said first portion.

5. The structure as recited in claim 2 wherein the edge of said backing plate opening is bent away from said friction lining.

References Cited in the file of this patent

UNITED STATES PATENTS

| | | | |
|---|---|---|---|
| 2,968,370 | Ruet | | Jan. 17, 1961 |
| 2,973,837 | Wilson | | Mar. 7, 1961 |
| 2,997,137 | Hodkinson | | Aug. 22, 1961 |
| 3,042,152 | Butler | | July 3, 1962 |

FOREIGN PATENTS

| | | | |
|---|---|---|---|
| 1,251,443 | France | | Dec. 12, 1960 |
| 861,648 | Great Britain | | Feb. 22, 1961 |